United States Patent
Roemer (10) Patent No.: US 11,408,994 B2
(45) Date of Patent: Aug. 9, 2022

(54) HIGH RESOLUTION WIDE SWATH SYNTHETIC APERTURE RADAR SYSTEM

(71) Applicant: Airbus Defence and Space GmbH, Taufkirchen (DE)

(72) Inventor: Christian Roemer, Markdorf (DE)

(73) Assignee: Airbus Defence and Space GmbH, Taufkirchen (DE)

(*) Notice: Subject to any disclaimer, the term of this patent is extended or adjusted under 35 U.S.C. 154(b) by 173 days.

(21) Appl. No.: 16/630,106

(22) PCT Filed: Jun. 20, 2018

(86) PCT No.: PCT/EP2018/066443
§ 371 (c)(1),
(2) Date: Jan. 10, 2020

(87) PCT Pub. No.: WO2019/015911
PCT Pub. Date: Jan. 24, 2019

(65) Prior Publication Data
US 2020/0174114 A1    Jun. 4, 2020

(30) Foreign Application Priority Data
Jul. 20, 2017 (EP) .................................. 17182326

(51) Int. Cl.
*G01S 13/90* (2006.01)
*H01Q 3/22* (2006.01)
(Continued)

(52) U.S. Cl.
CPC ........... *G01S 13/90* (2013.01); *G01S 13/9011* (2013.01); *G01S 13/9056* (2019.05); *H01Q 3/22* (2013.01);
(Continued)

(58) Field of Classification Search
CPC .. G01S 13/90; G01S 13/9056; G01S 13/9011; G01S 13/9054; G01S 2013/0263; H01Q 3/22; H01Q 3/30
(Continued)

(56) References Cited

U.S. PATENT DOCUMENTS 4,748,448 A * 5/1988 Thompson .............. G01S 13/42
342/25 A
4,851,848 A * 7/1989 Wehner ............... G01S 13/9011
342/201
(Continued)

FOREIGN PATENT DOCUMENTS

EP       1241487 A1 * 9/2002  ............. G01S 13/90
EP       2743727 A2 * 6/2014  ............. G01S 13/34
(Continued)

OTHER PUBLICATIONS

Pasquale Capece: "Active SAR Antennas: Design, Development, and Current Programs", International Journal of Antennas and Propagation, vol. 2009, pp. 1-11, XP055438890, ISSN: 1687-5869, SOI: 10.1155/2009/796064 (Year: 2009).*
(Continued)

*Primary Examiner* — Bernarr E Gregory
*Assistant Examiner* — Nuzhat Pervin
(74) *Attorney, Agent, or Firm* — Greer, Burns & Crain, Ltd.

(57) ABSTRACT

A side-looking High Resolution Wide Swath Synthetic Aperture Radar, HRWS-SAR, system comprising an antenna array and a beamforming network. The antenna array comprises a plurality of antenna elements to transmit and receive electromagnetic waves. The beamforming network includes a plurality of true time delay lines, TTDLs connected to a plurality of phase shifters. Each phase shifter is connected to a respective one of the plurality of antenna (Continued)

elements. The beamforming network engages with the transmit antenna array to transmit the electromagnetic waves by performing beamsteering across a swath using a pulse. The pulse has a chirped waveform and a transmit pulse duration. Beamsteering is performed based on an increasing or decreasing frequency of the chirped waveform over the transmit pulse duration. The beamforming network engages with the antenna array to receive, during a receive time window, echoes corresponding to the electromagnetic waves reflected by or from the swath.

15 Claims, 5 Drawing Sheets

(51) Int. Cl.
    *H01Q 3/30* (2006.01)
    *G01S 13/02* (2006.01)
(52) U.S. Cl.
    CPC ............ *H01Q 3/30* (2013.01); *G01S 13/9054* (2019.05); *G01S 2013/0263* (2013.01)
(58) Field of Classification Search
    USPC .......................................................... 342/25
    See application file for complete search history.

(56) References Cited

U.S. PATENT DOCUMENTS

| | | | | | |
|---|---|---|---|---|---|
| 4,990,925 | A * | 2/1991 | Edelsohn | ............. | G01K 11/006 374/E11.003 |
| 5,745,069 | A * | 4/1998 | Gail | ........................ | G01S 13/30 342/162 |
| 5,910,785 | A * | 6/1999 | Normant | ............. | G01S 13/9004 342/194 |
| 5,926,125 | A * | 7/1999 | Wood | ....................... | G01S 13/28 342/101 |
| 6,072,419 | A * | 6/2000 | Normant | ............... | G01S 13/282 342/194 |
| 6,870,500 | B2 * | 3/2005 | Suess | ....................... | G01S 13/90 342/25 C |
| 7,248,342 | B1 * | 7/2007 | Degnan | ................... | G01C 3/08 701/4 |
| 9,334,466 | B2 * | 5/2016 | Aehle | ..................... | A21D 8/042 |
| 9,479,232 | B1 * | 10/2016 | Loui | .................... | H04B 7/0617 |
| 9,958,539 | B2 * | 5/2018 | Torre | ...................... | G01S 13/24 |
| 2004/0150547 | A1 * | 8/2004 | Suess | ...................... | G01S 13/90 342/25 A |
| 2006/0244670 | A1 * | 11/2006 | Chekroun | ............ | H01Q 19/195 343/770 |
| 2007/0112180 | A1 * | 5/2007 | Gray | ..................... | G01N 33/542 530/391.7 |
| 2009/0109086 | A1 * | 4/2009 | Krieger | ................. | G01S 13/904 342/25 F |
| 2009/0219208 | A1 * | 9/2009 | Wiesbeck | ............... | G01S 3/465 342/377 |
| 2010/0135117 | A1 * | 6/2010 | McRory | .................. | E21B 47/16 367/82 |
| 2014/0266899 | A1 * | 9/2014 | Torre | .................... | G01S 13/895 342/371 |
| 2016/0084946 | A1 * | 3/2016 | Turbide | .................. | G01S 7/497 356/4.01 |
| 2018/0358696 | A1 * | 12/2018 | Shapoury | ............. | H01Q 25/002 |

FOREIGN PATENT DOCUMENTS

| | | | | | |
|---|---|---|---|---|---|
| EP | | 2743727 | B1 * | 1/2016 | ............. G01S 13/34 |
| EP | | 2834664 | B1 * | 4/2016 | ............. G01S 13/02 |
| EP | | 2778712 | B1 * | 5/2017 | ............. G01S 13/02 |
| WO | | 8505189 | A1 | 11/1985 | |
| WO | WO-2019226194 | A2 * | 11/2019 | ......... G01S 13/9052 |

OTHER PUBLICATIONS

International Search Report; priority document.
P. Capece: "Active SAR Antennas: Design, Development, and Current Programs," International Journal of Antennas and Propagation, vol. 2009, Jan. 1, 2009, pp. 1-11.
C. Heer et al., "Digitial Beam Forming Technology for Phased Array Antennas," 2011 2nd International Conference on Space Technology, Sep. 1, 2011, pp. 1-4.
Y. Alvarez et al., "Submillimeter-Wave Frequency Scanning System for Imaging Applications," IEEE Transactions on Antennas and Propagation, IEEE Service Center, Piscataway, NJ, US., vol. 61, No. 11, Nov. 1, 2013, pp. 5689-5696.
European Search Report; priority document.

* cited by examiner

HIGH RESOLUTION WIDE SWATH SYNTHETIC APERTURE RADAR SYSTEM

CROSS-REFERENCES TO RELATED APPLICATIONS

This application claims the benefit of the International Application No. PCT/EP2018/066443, filed on Jun. 20, 2018, and of the European patent application No. 17182326.3 filed on Jul. 20, 2017, the entire disclosures of which are incorporated herein by way of reference.

FIELD OF THE INVENTION

The present disclosure concerns a side-looking High Resolution Wide Swath Synthetic Aperture Radar, HRWS-SAR, system and a satellite comprising an HRWS-SAR system.

BACKGROUND OF THE INVENTION

High Resolution Wide Swath (HRWS) imaging with spaceborne Synthetic Aperture Radar (SAR) systems is a concept usually embarking on multiple phase centers distributed in both azimuthal and elevational direction under use of Digital Beamforming (DBF) techniques. On the one hand, the displaced phase centers technique comes along with an improvement in azimuthal resolution at a reduced pulse repetition frequency (PRF). On the other hand, the multiple phase centers technique in elevation comes along with an improvement in signal-to-noise ratio by using a high gain pencil beam scanning on receive (SCORE) over a target area while illuminating a swath with a broad beam pattern on transmit.

When imaging a wide swath under use of a SAR system, a beam in across track direction is usually too narrow to illuminate the swath. In a conventional phased array SAR system this can only be solved by antenna tapering to widen the beam. However, this comes along with a pronounced loss in signal gain and gives rise to range ambiguities.

The SCan On REceive technique (SCORE) based on DBF provides one solution to this problem. SCORE relies on multiple receivers, wherein each receiver has its own digitization. Thus, the scanning beam is realized by digital onboard processing in real-time. Further, the swath is illuminated by a broad low gain transmit beam realized either by a separate transmit antenna or by a large phased array antenna with tapering to widen the beam pattern.

Each receiver having its own digitization comes along with cost and hardware complexity.

Thus, it is an object of the present disclosure to provide an HRWS-SAR system with moderate complexity and cost.

SUMMARY OF THE INVENTION

According to a first aspect, a side-looking High Resolution Wide Swath Synthetic Aperture Radar, HRWS-SAR, system is provided. The HRWS-SAR system comprises an antenna array and a beamforming network. The antenna comprises a plurality of antenna elements. The antenna array is adapted and arranged to transmit and receive electromagnetic waves. The beamforming network includes a plurality of true time delay lines, TTDLs. The beamforming network includes a plurality of phase shifters. The plurality of TTDLs is arranged and connected to the plurality of phase shifters. Each of the plurality of phase shifters is arranged and connected to a respective one of the plurality of antenna elements. The beamforming network engages with the transmit antenna array to transmit the electromagnetic waves by performing beamsteering across a swath under use of a pulse. The pulse has a chirped waveform and a transmit pulse duration. Beamsteering is performed based on an increasing or decreasing frequency of the chirped waveform over the transmit pulse duration. The beamforming network engages with the antenna array to receive, during a receive time window, echoes corresponding to the electromagnetic waves being reflected by or from the swath.

The present disclosure provides an alternative to SCORE without using DBF by exploitation of analogue frequency scanning by sweeping a beam over the target area. Thereby, a much lower hardware complexity is needed. The present disclosure offers advantages not obtainable by SCORE such as inherent pulse compression, excellent signal-to-noise performance, inherent impulse response sidelobe suppression and overhead free data sampling at a significantly reduced need for transmit peak power.

The beamsteering may be performed by the principle of frequency scanning across the swath.

The HRWS-SAR system may be adapted for spaceborne applications.

Beamsteering may be performed, for example by frequency scanning, in scanning directions of the swath beginning in a first scanning direction corresponding to a first frequency of the chirped waveform and ending in a second scanning direction corresponding to a second frequency of the chirped waveform.

The swath may be defined as ground range between a first point on ground and a second point on ground. The first point and the HRWS-SAR system may be distant by a first slant range. The second point and the HRWS-SAR system may be distant by a second slant range.

The first frequency and the second frequency may be set to perform beamsteering, in particular by frequency scanning, across the swath such that the first frequency is associated with the first slant range and the second frequency is associated with the second slant range.

The term frequency scanning can also be understood as using a frequency scanning antenna such that the principle of frequency scanning is applied by the frequency scanning antenna. The antenna array may also be referred to as frequency scanning antenna.

A swath width of the swath may be set by a true time increment between adjacent ones of the plurality of TTDLs and a phase increment between adjacent ones of the plurality of phase shifters.

The true time increment between adjacent TTDLs and the phase increment between adjacent phase shifters may be set such that the first frequency is pointing towards the first slant range and the second frequency is pointing towards the second slant range.

Each of the plurality of TTDLs may be arranged and connected to a respective one of the plurality of phase shifters. Each of the plurality of TTDLs may be arranged and connected to two adjacent ones of the plurality of phase shifters. Each of the plurality of TTDLs may be arranged and connected to a subset of the plurality of phase shifters.

The chirped waveform may be a linear or non-linear up- or down-chirp. A chirp may be defined as the pulse having the chirped waveform over the transmit pulse duration.

The antenna array may comprise a plurality of antenna elements arranged in elevational direction. The antenna array may be further adapted and arranged to transmit and receive the electromagnetic waves in the form of a pencil beam in a beamsteering manner Pencil beam refers to a non-tapered beam with homogenous amplitude of all antenna elements.

The first slant range may correspond to a longest distance between the HRWS-SAR system and the swath. The second slant range may correspond to a shortest distance between the HRWS-SAR system and the swath.

The first frequency may be a lowest frequency of the chirped waveform. The first frequency may coincide with a beginning of the pulse, for example an up-chirp pulse. The second frequency may be a highest frequency of the chirped waveform. The second frequency may coincide with an ending of the pulse.

Alternatively, the second frequency may coincide with a beginning of a down-chirp pulse. The first frequency may coincide with an ending of the down-chirp pulse.

The first frequency may be a highest frequency of the down-chirped waveform and may coincide with the beginning of the pulse, and the second frequency may be a lowest frequency of the chirped waveform and may coincide with an ending of the pulse.

The receive time window may be shorter than the transmit pulse duration.

The transmit pulse duration may be aligned with a travel duration of the echoes such that the echoes arrive at the receive antenna array at substantially the same time. In this case, the transmit pulse duration may be identical to the difference between the two-way travel durations of a pulse to the first slant range and the second slant range. The transmit pulse duration may be aligned with a difference between the travel durations of the echoes from the first slant range and the second slant range such that the echoes arrive at the antenna array at substantially the same time According to a second aspect, a satellite mounting an HRWS-SAR system according to the first aspect is provided.

The HRWS-SAR may be operated in Stripmap Mode, Spotlight Mode or Burst Mode. The HRWS-SAR may be operable or may be operated in a high, medium or low resolution mode.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the transmitting network and the receiving network may be implemented partially as a computer, a logical circuit, an FPGA (Field Programmable Gate Array), a processor (for example, a microprocessor, microcontroller (μC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

Even if some of the aspects described above have been described in reference to the HRWS-SAR system, these aspects may also be applicable to a method. Likewise, the aspects described above in relation to the HRWS-SAR system may be applicable in a corresponding manner to the method.

It is also to be understood that the terms used herein are for the purpose of describing individual embodiments and are not intended to be limiting. Unless otherwise defined, all technical and scientific terms used herein have the meaning which corresponds to the general understanding of the skilled person in the relevant technical field of the present disclosure; they are to be understood too neither too broadly nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed on the basis of the definition in the lexicon or the context. A too narrow interpretation should be avoided.

It is to be understood that terms such as, e.g., "comprising" "including" or "having," etc. mean the presence of the described features, numbers, operations, acts, components, parts, or combinations thereof, and do not exclude the presence or possible addition of one or more further features, numbers, operations, acts, components, parts or their combinations.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to," "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

The variants of the functional and operational aspects as well as their functional and operational aspects described herein are only for a better understanding of its structure, its functions and properties; they do not limit the disclosure to the embodiments. The figures are partially schematic, said essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

In the figures herein, corresponding or functionally similar components are provided with the same or similar reference numerals. The HRWS-SAR system will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

The present disclosure provides an analogue beamforming technique. The beam sweeps over the target area by exploiting a frequency scanning effect. In contrast to SCORE, a pencil beam is used in both TX and RX. This leads not only to a higher system gain but also exhibits better suppression of ambiguous targets.

The frequency scanning characteristic is a phenomenon of a certain type of antennas, e.g., travelling or leaky wave antennas exhibit this effect also present on scanned arrays using phase shifters instead of true time delay lines (TTDLs). While it is often an unwanted effect as it leads to a fanning out pattern versus frequency, the present disclosure makes use of the frequency scanning effect on purpose by using phase shifters and TTDLs in the transmit and receive network.

Figure 1:
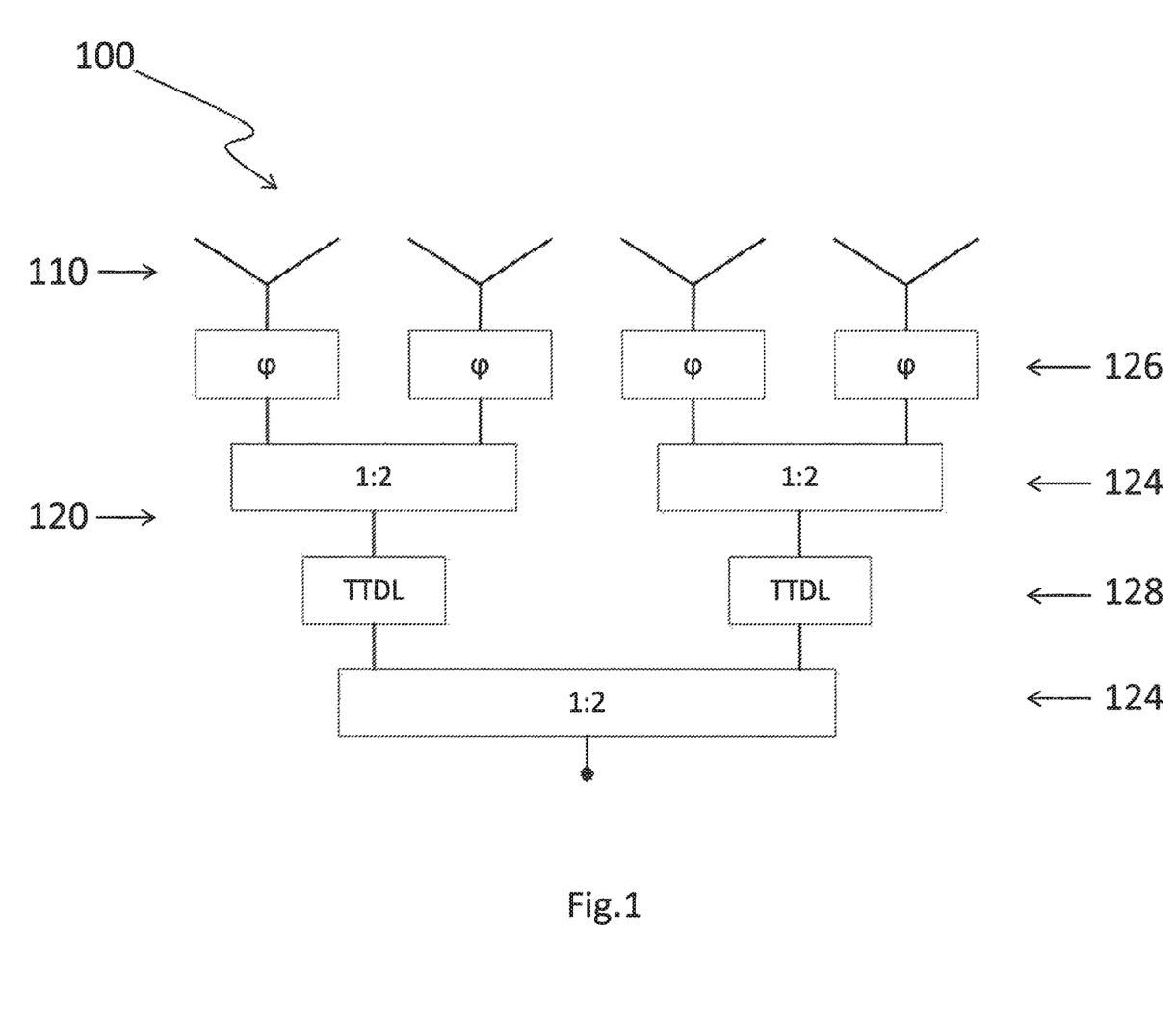
FIG. 1 schematically illustrates a beamforming network to be used in transmit and receive.

FIG. 1 schematically illustrates a beamforming network 120 to be used in transmit and receive for an HRWS-SAR system 100 (only partly shown in FIG. 1). It shows a block diagram of a phased array of antenna elements 110 with phase shifters 126 and TTDLs 128. Further, dividers 124 are used to evenly spread a signal to antenna elements 110 (in transmit) or evenly pass a signal from the antenna elements 110 (in receive) when no phase increment and true time delay is present.

In FIG. 1, not each antenna element 110 is provided upstream by a separate TTDL 128, but it is a possible configuration to provide each antenna element 110 with both one phase shifter 126 and one TTDL 128. Several adjacent antenna elements 110 can also be grouped and connected to a common TTDL 128. Thus, as shown in FIG. 1, each TTDL 128 can be arranged and connected upstream to two adjacent phase shifters 126, which themselves are each arranged and connected upstream to one antenna element 110.

Figure 2:
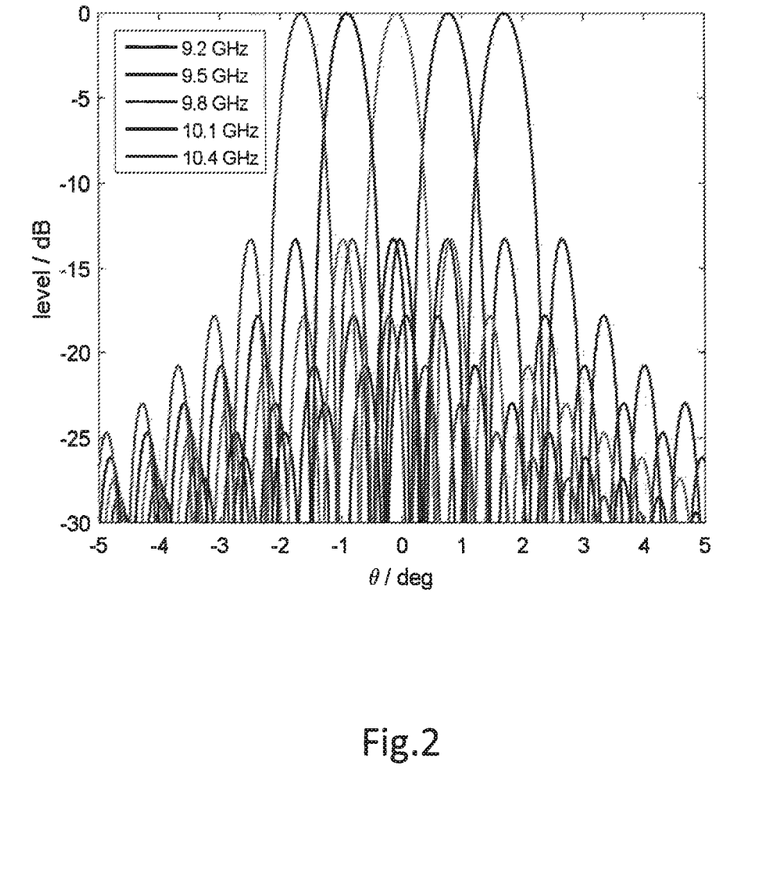
FIG. 2 schematically illustrates an Antenna pattern of an antenna array using the frequency scanning principle under use of TTDLs and phase shifters.

FIG. 2 schematically illustrates an antenna pattern of an antenna array using the frequency scanning principle under use of TTDLs and phase shifters. A frequency squint of several beamwidths over a bandwidth of 1200 MHz using an antenna array of 128 radiating elements (antenna elements) is shown.

The scanning directions $\theta_0$ of a linear antenna array with a phase shifter increment $\beta$ and a true time delay increment $\Delta\tau$ between adjacent antenna elements can be expressed as:

$$\sin\theta_0 = \frac{c}{d}\left(\Delta\tau - \frac{\beta}{2\pi f}\right) \quad (1)$$

c is the propagation velocity and d the spacing between adjacent antenna elements. Thus, the scanning direction consists of a frequency independent part controlled by the true time delay increment $\Delta\tau$ and a part inversely proportional to the frequency controlled by the phase shifter increment $\beta$. The beam dispersion and the beam pointing direction can be set independently from each other with these two degrees of freedom.

In the following, echo compression by frequency scanning is described.

Frequency scanning offers the possibility of compressing the received echoes in a side-looking geometry in combination with a chirped waveform. In the case of a linear up chirp as typically used in a SAR system, the frequency scanning is chosen such that the beam associated with a lowest frequency is pointing towards the far edge of the swath and the beam associated with a highest frequency is pointing towards the near edge.

Figure 3:
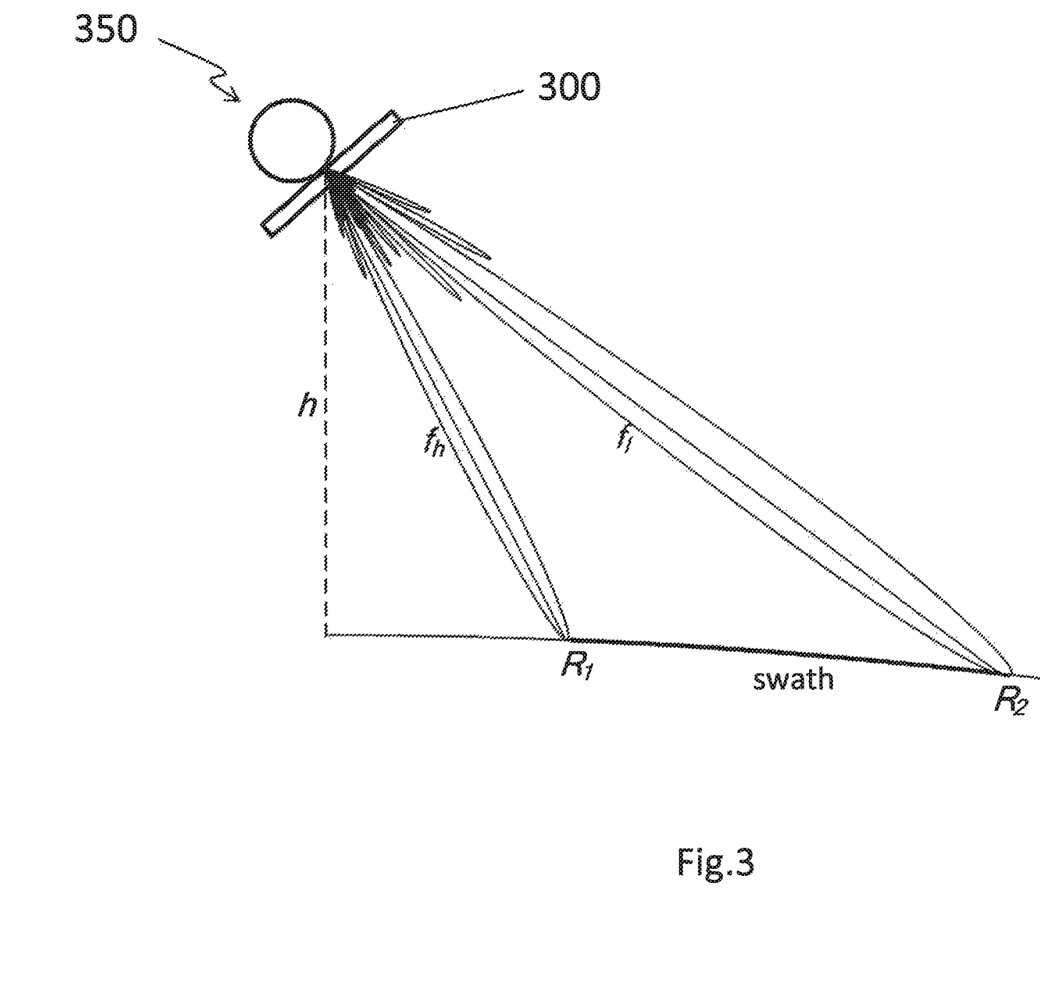
FIG. 3 schematically illustrates a Side-looking geometry for the frequency scanning principle.

FIG. 3 schematically illustrates a Side-looking geometry for the frequency scanning principle. A satellite 350 is shown comprising the HRWS-SAR 300 as explained with respect to FIG. 1.

An active phased array antenna at altitude h performs beamsteering set according to equation (1) such that the beam with the highest frequency $f_h$ is pointing towards a near slant range $R_1$ and the beam with the lowest frequency $f_l$ is pointing towards a far slant range $R_2$. When transmitting a linear up chirp, the beam sweeps over the swath beginning at the far range and moving towards the near range. This means that beams with the low frequencies pointed to the far range are emitted first and beams with the high frequencies pointed to the near range are lagging.

A transmit pulse duration $\tau_P$ is chosen as:

$$\tau_P = \frac{2(R_2 - R_1)}{c} \quad (2)$$

A longer travel duration of the far range echoes is compensated by a preceding transmission due to the chirp ramp. Thus, all echoes from the swath coincide at the SAR system 300 at the same time.

Figure 4:
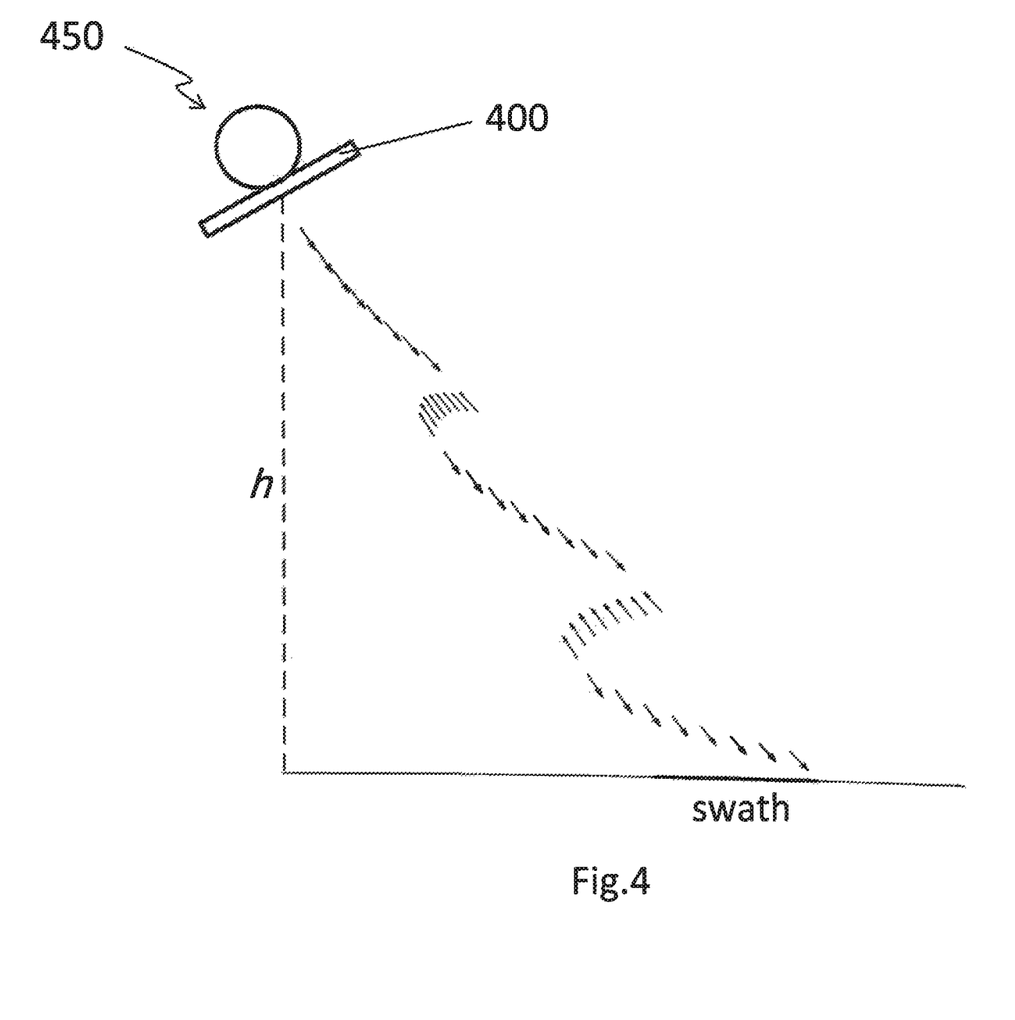
FIG. 4 schematically illustrates transmitted (pointing to the swath) and reflected pulses (pointing to the antenna array) with a transmit pulse duration aligned with the echoes' travel duration.

FIG. 4 schematically illustrates transmitted (pointing to the swath) and reflected pulses (pointing to the antenna array) with a transmit pulse duration aligned with the echoes' travel duration. For comprehension, the satellite 450 is shown comprising the HRWS-SAR 400 as explained with respect to FIGS. 1 and 3.

Due to this range compensation a short opening of the receive time window of much less than $\tau_P$ is sufficient to collect all echoes. This permits high pulse duty cycles of more than 50% resulting in a high average power. This behavior is crucially different from conventional SAR systems, where the receive time window, also called echo window length, is always longer than the transmit pulse duration. In order to cover a wide swath with a conventional SAR system, the transmit pulse duration has to be kept low (typically below 20% pulse duty cycle) to retain enough time between the transmit events in order to collect all echoes reflected from the swath.

The transmit pulse duration given by equation (2) should be considered as a guide value, in some cases it may be advantageous to choose a shorter pulse duration. The optimum pulse duration is a tradeoff between achievable swath width and resulting average transmit power.

As a consequence of this principle, each target within the swath sees only a fraction of the total chirp bandwidth resulting in a loss of spatial slant range resolution, the effective bandwidth is:

$$B_{eff} = B_{chirp} \frac{\Delta\theta_{ant}}{\Delta\theta_{ant} + |\theta_2 - \theta_1|} \quad (3)$$

$\theta_1$ and $\theta_2$ are look angles to the near and far edge of the swath and $\Delta\theta_{ant}$ is the beamwidth of the antenna pencil beam of the antenna array. As equation (3) suggests, there is a trade between achievable swath width and resolution. The resolution can be improved by using a wider beamwidth. Since the resulting range spectrum for each target is directly weighted by the sweeping antenna pattern, it is worthwhile to exceed the −3 dB interval of the beam pattern. Thus, excellent sidelobe suppression of the corresponding impulse response functions is directly achieved without using any additional weighting in a following SAR processing step.

System parameters of an exemplary system design in X-Band are given in table 1 below:

TABLE 1

| Orbit height | 514 km |
|---|---|
| Radar center frequency | 9.8 GHz |
| Radar chirp bandwidth | 1200 MHz |
| Antenna length | 8 m |

TABLE 1-continued

| Antenna height | 1.4 m |
|---|---|
| Digital phase centers in azimuth | 4 |
| TX Peak Power | 4000 W |

This exemplary system design uses a displaced phase center antenna with four digital channels. Thus, the azimuthal resolution can be improved approximately by a factor equivalent to a number of channels while still operating with a regular low pulse repetition frequency (PRF). The performance is demonstrated by the following swath parameters in Table 2:

TABLE 2

| Observation mode | Stripmap |
|---|---|
| Near edge incidence angle | 35.4 deg |
| Far edge incidence angle | 41 deg |
| Swath width | 70 km |
| PRF | 1992 Hz |
| TX pulse duration | 380 µs |

The SAR system can be operated within an access range of typically 20 degrees to 55 degrees. The above swath parameters have been picked as an example. The transmit pulse duration has been chosen slightly shorter as equation (2) suggests. It is found that an achievable swath can be increased by choosing a TX pulse duration which is between 200 µs and 500 µs, in particular, between 300 and 400.

Figure 5:
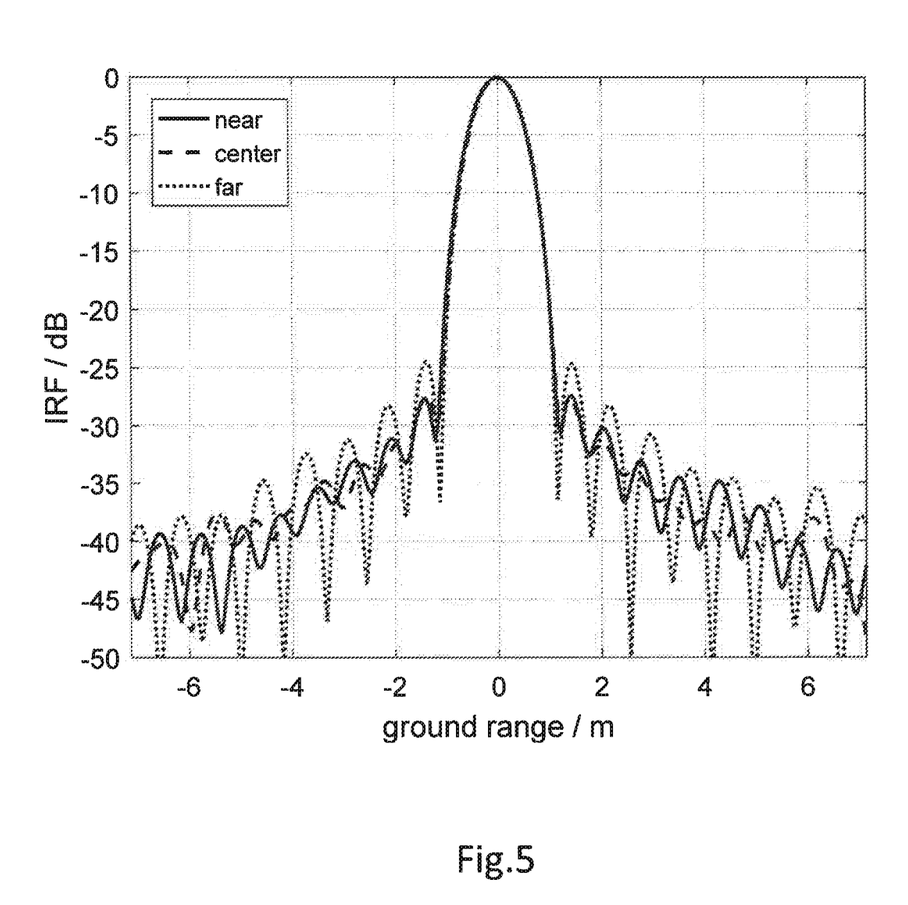
FIG. 5 schematically illustrates the range impulse response functions (IRFs) with targets placed at near, center and far position within swath.

FIG. 5 schematically illustrates the range impulse response functions (IRFs) with targets placed at near, center and far position within swath. The x-axis gives the relative distance to the nominal position of each target thus they appear overlapping although they are distributed across the swath.

Simulation of raw data range line with point targets placed at near, center and far position within the swath and range (echo) compression delivered the following performance of the IRF shown in FIG. 5:

| Along track resolution | ~1 m |
|---|---|
| Across track resolution | <1 m |
| PSLR | >24 dB |
| NESZ | <−24 dB |

It is found that the performance across the complete swath is nearly invariant with respect to the IRF and the noise equivalent sigma zero (NESZ). The peak sidelobe ratio (PSLR) is >24 dB. Ground resolution is below 1 m.

The proposed principle is not just limited to observation in Stripmap Mode, it is also eligible for Spotlight Mode and operation in Burst Modes such as SCANSAR or TOPS (Terrain Observation by Progressive Scanning) Burst operation would be well suited to the frequency scanning principle as it is typically operated with medium to low resolution modes. Additionally, by exploiting the displaced phase center technique in azimuth, ultra-wide coverage with still respectable resolution is feasible. Further, Ka-Band SAR system designs typically suffer from a narrow beam and thus poor coverage. Making use of the large available bandwidth in Ka-Band, the frequency scanning principle seems to be an adequate way to enable wide swath imaging. As active phased array technology is still challenging in Ka-Band, consideration of passive antenna arrays for frequency scanning may be preferable. Although a linear chirp is doing reasonably well in most cases, usage of a slightly non-linear chirp waveform gives additional control to align the echoes not only from the near and far edge of the swath but from all positions throughout the swath. Thus the required echo window length can be further shortened enabling an even wider swath coverage.

The frequency scanning principle is well suited for multi-purpose SAR missions designed with wide bandwidth to perform high resolution SAR but also wide area SAR imaging with medium resolution. With widely reduced hardware complexity and relaxed transmit power demands compared to SAR systems fully relying on DBF, the frequency principle offers a couple of features not obtainable by state of the art techniques. These features are the inherent echo compression achieved by aligning the chirp ramp of the transmitted pulse with the travel duration of the echoes received from the swath to be imaged. Thus, high transmit duty ratios are feasible with a pulse duration longer than the receive time window. In combination with usage of the high gain pencil beam in TX and RX, this yields a significant improvement in signal-to-noise ratio (SNR) and at the same time eliminates any garbage data within the sampled receive time window. As the beam scans over the swath on both transmit and receive, the energy is evenly spread over the entire swath, yielding constant high performance independent of swath position. Another feature is the directly achieved spectral shaping yielding excellent sidelobe properties of the impulse response function making the use of extra spectral windowing in the processing unnecessary.

The present disclosure is not limited in any way to the embodiments described above. On the contrary, there are many possibilities for modifications thereof, which are apparent to an average skilled person without departing from the underlying idea of the present disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A side-looking High Resolution Wide Swath Synthetic Aperture Radar, HRWS-SAR, system comprising:
an antenna array comprising a plurality of antenna elements, wherein the antenna array is adapted and arranged to transmit and receive electromagnetic waves; and
a beamforming network including a plurality of true time delay lines, TTDLs, and a plurality of phase shifters,
wherein each of the TTDLs from the plurality of TTDLs is arranged and connected to one or more of the phase shifters from the plurality of phase shifters,
wherein each of the phase shifters from the plurality of phase shifters is arranged and connected to a respective one of the antenna elements from the plurality of antenna elements such that each of the TTDLs from the plurality of TTDLs is in communication with one or more antenna elements from the plurality of antenna elements,
wherein the beamforming network engages with the antenna array to transmit the electromagnetic waves by performing beamsteering across a swath under use of a pulse, which has a chirped waveform and a transmit pulse duration, and
wherein beamsteering is performed based on an increasing or decreasing frequency of the chirped waveform over the transmit pulse duration, and a beam dispersion and a beam pointing are configured to be set independently from each other.

2. The side-looking HRWS-SAR system according to claim 1, wherein beamsteering is performed in scanning directions of the swath beginning in a first scanning direction corresponding to a first frequency of the chirped waveform and ending in a second scanning direction corresponding to a second frequency of the chirped waveform.

3. The side-looking HRWS-SAR system according to claim 2,
wherein the swath is defined as ground range between a first point on ground and a second point on ground,
wherein the first point and the HRWS-SAR system are distant by a first slant range and the second point and the HRWS-SAR system are distant by a second slant range.

4. The side-looking HRWS-SAR system according to claim 3, wherein the first frequency and the second frequency are set to perform beamsteering across the swath such that the first frequency is associated with the first slant range and the second frequency is associated with the second slant range.

5. The side-looking HRWS-SAR system according to claim 1, wherein a swath width of the swath is set by a true time increment between adjacent ones of the plurality of TTDLs and a phase increment between adjacent ones of the plurality of phase shifters.

6. The side-looking HRWS-SAR system according to claim 1, wherein each of the plurality of TTDLs is arranged and connected to a respective one of the plurality of phase shifter.

7. The side-looking HRWS-SAR system according to claim 1, wherein each of the TTDLs from the plurality of TTDLs is arranged and connected to two adjacent phase shifters from the plurality of phase shifters.

8. The side-looking HRWS-SAR system according to claim 1, wherein each of the TTDLs from the plurality of TTDLs is arranged and connected to a subset of phase shifters from the plurality of phase shifters.

9. The side-looking HRWS-SAR system according to claim 1, wherein the chirped waveform is a linear or non-linear up- or down-chirp.

10. The side-looking HRWS-SAR system according to claim 3, wherein the first slant range corresponds to a longest distance between the HRWS-SAR system and the swath, and the second slant range corresponds to a shortest distance between the HRWS-SAR system and the swath.

11. The side-looking HRWS-SAR system according to claim 2, wherein the first frequency is a lowest frequency of the chirped waveform and coincides with a beginning of the pulse, and the second frequency is a highest frequency of the chirped waveform and coincides with an ending of the pulse.

12. The side-looking HRWS-SAR system according to claim 2, wherein the first frequency is a highest frequency of the down-chirped waveform and coincides with a beginning of the pulse, and the second frequency is a lowest frequency of the chirped waveform and coincides with an ending of the pulse.

13. The side-looking HRWS-SAR system according to claim 1, wherein the receive time window is shorter than the transmit pulse duration.

14. The side-looking HRWS-SAR system according to claim 3, wherein the transmit pulse duration is aligned with a difference between travel durations of echoes from the first slant range and the second slant range such that the echoes arrive at the antenna array at substantially the same time.

15. A satellite mounting an HRWS-SAR system according to claim 1.

* * * * *